(12) United States Patent
Jiang et al.

(10) Patent No.: US 12,457,883 B2
(45) Date of Patent: Oct. 28, 2025

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Wei Jiang, Hubei (CN); Wenxu Xianyu, Hubei (CN); Yuan Yan, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/701,943

(22) PCT Filed: Jan. 17, 2024

(86) PCT No.: PCT/CN2024/072784
§ 371 (c)(1),
(2) Date: Apr. 17, 2024

(87) PCT Pub. No.: WO2025/148092
PCT Pub. Date: Jul. 17, 2025

(65) Prior Publication Data
US 2025/0234745 A1    Jul. 17, 2025

(30) Foreign Application Priority Data
Jan. 11, 2024   (CN) .......................... 202410045402.7

(51) Int. Cl.
| | |
|---|---|
| *H10K 59/65* | (2023.01) |
| *G06V 40/13* | (2022.01) |
| *H10K 59/35* | (2023.01) |
| *H10K 59/40* | (2023.01) |

(52) U.S. Cl.
CPC ......... *H10K 59/65* (2023.02); *G06V 40/1318* (2022.01); *H10K 59/352* (2023.02); *H10K 59/40* (2023.02)

(58) Field of Classification Search
CPC ...... H10K 59/65; H10K 59/352; H10K 59/40; G06V 40/1318
See application file for complete search history.

(56) References Cited

U.S. PATENT DOCUMENTS

| | | | |
|---|---|---|---|
| 2015/0331508 A1* | 11/2015 | Nho ...................... | G06F 3/0445 345/173 |
| 2018/0113558 A1* | 4/2018 | Cho ................... | G06V 40/1306 |
| 2023/0177865 A1* | 6/2023 | Hua .................. | H10F 39/80377 345/174 |

* cited by examiner

Primary Examiner — Abhishek Sarma
(74) Attorney, Agent, or Firm — PV IP PC; Wei Te Chung

(57) ABSTRACT

The present application provides a display panel and a display device. The display panel is not disposed with touch patterns between optical sensors and at least one of adjacent third sub-pixel units, so that when the third sub-pixel units emit light, the light reflected from the touch electrodes to the optical sensors is reduced, the interference of the light from the pixel units reflected from the touch electrodes to the optical sensors is reduced, and the signal-to-noise ratio of the optical sensors is improved.

20 Claims, 10 Drawing Sheets

DISPLAY PANEL AND DISPLAY DEVICE

CROSS REFERENCE TO RELATED APPLICATIONS

This application is a US national phase application based upon an International Application No. PCT/CN2024/072784, filed on Jan. 17, 2024, and this application claims priority of Chinese patent application No. 202410045402.7 filed on Jan. 11, 2024 and titled 'DISPLAY PANEL AND DISPLAY DEVICE'. The disclosure of the above applications are incorporated herein by reference in their entireties.

TECHNICAL FIELD

The present application relates to the field of display, in particular to a display panel and a display device.

BACKGROUND

OLED (Organic Light-Emitting Diode) display devices are widely used in various fields due to their lightweight, wide viewing angle, fast response, low temperature resistance, high luminous efficiency, and the ability to prepare flexible displays that can be bent. In order to realize the function of fingerprint identification, fingerprint modules are set up in OLED display devices. Specifically, fingerprint technology is divided into capacitive fingerprint technology, optical fingerprint technology and ultrasonic fingerprint technology. The optical fingerprint includes under-screen optical fingerprint and in-screen optical fingerprint. With the development of thin and light display devices, in-screen optical fingerprint has become a better choice for OLED display devices. In-screen optical fingerprint refers to the integration of the optical fingerprint sensors in the screen, by releasing infrared light to irradiate the finger and reflect it back, the optical fingerprint sensors receive the reflected light and extract the fingerprint features, thus realizing the fingerprint identification function. Meanwhile, in order to realize the touch function, the OLED display devices are equipped with touch wiring, and the touch wiring reflect a portion of the light emitted from the pixel units to the optical fingerprint sensors, resulting in the interference of the optical fingerprint sensor, low signal-to-noise ratio, and worse performance.

Therefore, the prior OLED display devices have the technical problems that the touch wiring reflect the light emitted by the pixel units, which result in a low signal-to-noise ratio of the optical fingerprint sensors.

SUMMARY

Embodiments of the present application provide a display panel and a display device for improving the existing OLED display devices with the technical problems that the light emitted from the pixel units is reflected by the touch wiring, resulting in a low signal-to-noise ratio of the optical fingerprint sensors.

To solve the above problem, the present application provides the following technical solution.

Embodiments of the present application provide a display panel including:

a substrate;
a driving circuit layer disposed on a side of the substrate, in which the driving circuit layer includes a plurality of driving circuits and optical sensors disposed between the driving circuits;
a light-emitting layer disposed on a side of the driving circuit layer away from the substrate, in which the light-emitting layer includes a plurality of pixel units disposed in an array, and the pixel units are electrically connected to corresponding drive circuits; and
a touch control layer disposed on a side of the light-emitting layer away from the substrate, in which the touch control layer includes a plurality of touch electrodes comprising touch patterns disposed between the pixel units;
in which the plurality of the pixel units include a plurality of first sub-pixel units, a plurality of second sub-pixel units, and a plurality of third sub-pixel units, in which the plurality of the first sub-pixel units and the plurality of the second sub-pixel units are alternately arranged in a first direction to form a plurality of first pixel rows, the plurality of the first sub-pixel units and the plurality of the second sub-pixel units are alternately arranged in a second direction to form a plurality of first pixel columns, the plurality of the third sub-pixel units are arranged in the first direction to form a plurality of second pixel rows, and the plurality of the third sub-pixel units are arranged in the second direction to form a plurality of second pixel columns, and the first direction is intersected by the second direction;
the optical sensors are disposed in the first direction between adjacent first sub-pixel units and second sub-pixel units, and the optical sensors are disposed in the second direction between adjacent third sub-pixel units;
the touch patterns are not disposed between the optical sensors and at least one of adjacent first sub-pixel units and second sub-pixel units in the first direction; and
the touch patterns are not disposed between the optical sensors and at least one of adjacent third sub-pixel units in the second direction.

Moreover, embodiments of the present application provide a display device including a display panel as described in any one of the above embodiments.

BRIEF DESCRIPTION OF THE DRAWINGS

The following detailed description of specific embodiments of the present application, in conjunction with the accompanying drawings, will make the technical solutions and other beneficial effects of the present application clear.

DETAILED DESCRIPTION

Figure 1:
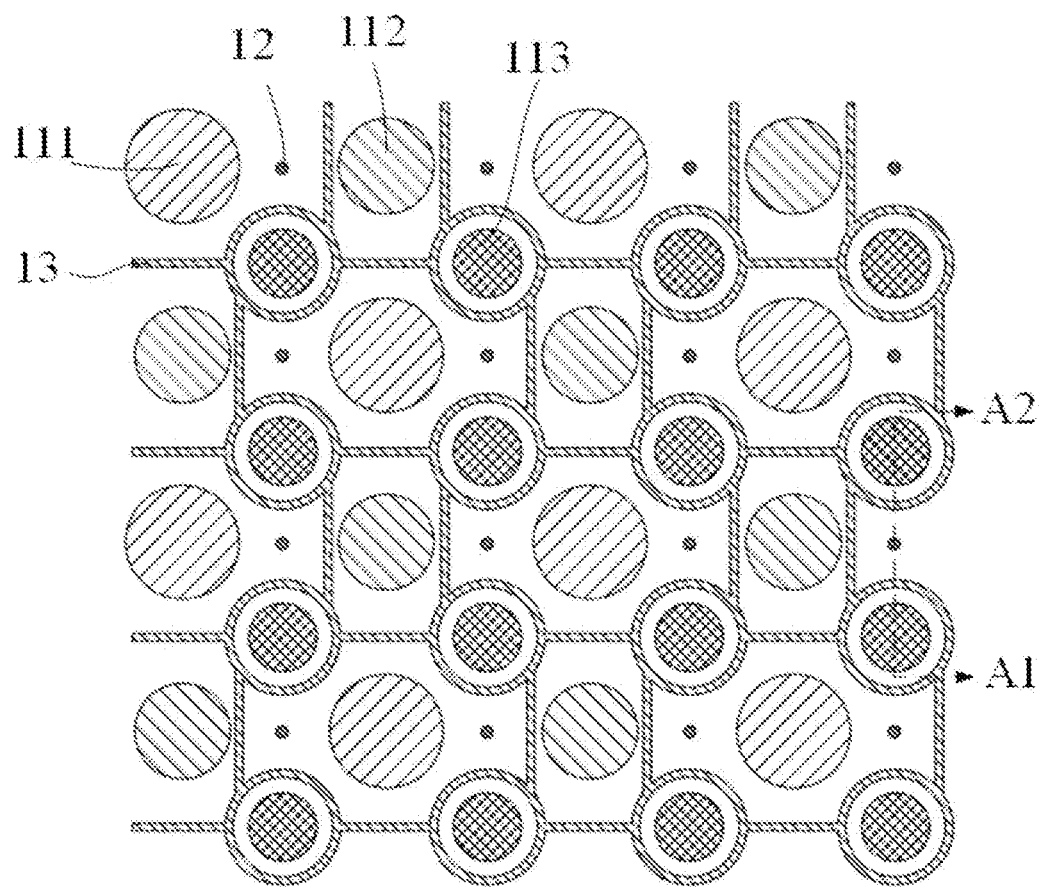
FIG. 1 is a schematic diagram of an existing display device.

The technical solutions in the embodiments of the present application will be clearly and fully described below in conjunction with the accompanying drawings in the embodiments of the present application. It is clear that the described embodiments are only a part of the embodiments of the present application, and not all of the embodiments. Based on the embodiments in this application, all other embodiments obtained by the person skilled in the art without creative labor fall within the scope of protection of this application.

In the description of the present application, it is to be understood that the terms "center", "longitudinal", "transversal", "length", "width", "thickness", "up", "down", "front", "back", "left", "right", "vertical", "horizontal", "top", "bottom", "inside", "outside," "clockwise," "counter-clockwise", and the like indicate orientation or positional relationship based on those shown in the accompanying drawings, and are intended only to facilitate the description of the present application and to simplify the description, and are not intended to indicate or imply that the device or element referred to must have a particular orientation, be constructed and operated in a particular orientation, therefore are not to be construed as a limitation of the present application. Furthermore, the terms "first" and "second" are used only for description purposes, and are not to be construed as indicating or implying relative importance or implicitly specifying the number of technical features indicated. Thus, a feature defined with "first", "second" or the like may expressly or implicitly include one or more of the described features. In the description of the present application, "plurality" or "a plurality of" means two or more, unless otherwise expressly and specifically limited.

In the description of the present application, it is to be noted that, unless otherwise expressly specified and limited, the terms "mounted", "coupled", "connected" are to be understood in a broad sense. For example, the terms represent a fixed connection, a removable connection, or a connection in one piece; a mechanical connection, an electrical connection or a connection that can communicate with each other; a direct connection or an indirect connection through an intermediate medium; or a connection within two elements or an interaction between two elements. For those of ordinary skill in the art, the specific meaning of the terms in this application may be understood on a case-by-case basis.

In the present application, unless otherwise expressly disposed and limited, the definition that the first feature is "on", or "under" the second feature may include the meanings that the first and second features are in direct contact, or the first and second features are in contact indirectly through another feature between them. Furthermore, the definition that the first feature is "above", "over" and "on top of" the second feature includes that the first feature is directly above or diagonally above the second feature, or simply indicates that the first feature is horizontally higher than the second feature. The definition that the first feature is "below", "under", and "beneath" the second feature includes that the first feature is directly below or diagonally below the second feature, or simply indicates that the first feature is horizontally lower than the second feature.

The following application provides a number of different implementation examples or embodiments for realizing different structures of the present application. In order to simplify the application of the present application, the parts and settings of particular examples are described below. They are, of course, only examples and are not intended to limit the present application. In addition, the present application may repeat reference numerals and/or reference letters in various examples, such repetition is for purpose of simplicity and clarity, and is not in itself indicative of a relationship between the various embodiments and/or settings discussed. In addition, various specific embodiments of processes and materials are disposed in the present application, but those of ordinary skill in the art may realize the application of other processes and/or the use of other materials.

Figure 2:
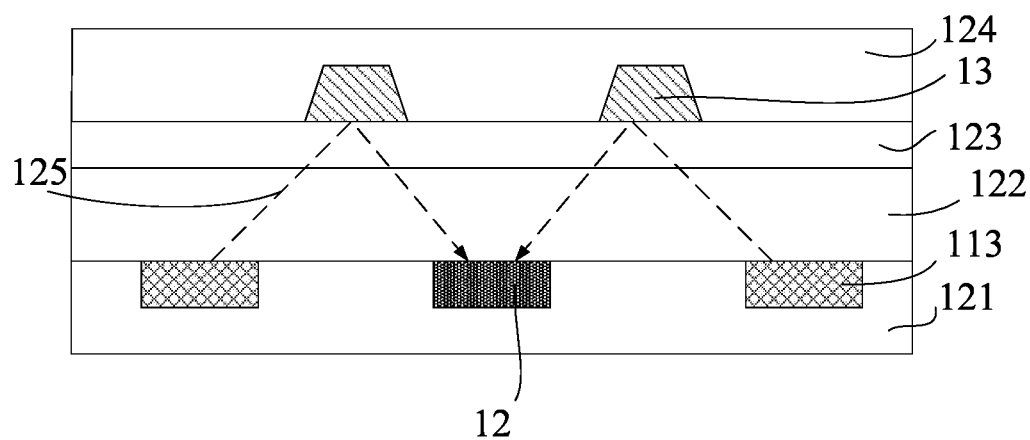
FIG. 2 is an A1-A2 cross-sectional diagram of the display device of FIG. 1.

As shown in FIG. 1, an existing display device, in order to realize a fingerprint recognition function and a touch control function, is disposed with an optical fingerprint sensor 12 and touch control lines 13 in the screen respectively. Specifically, the display device includes blue sub-pixels 111, red sub-pixels 112, and green sub-pixels 113. The touch control lines 13 are disposed around each green sub-pixel 113, and the touch control lines 13 are connected to each other, and the optical fingerprint sensor 12 is disposed between adjacent green sub-pixels 113 in a longitudinal direction. As shown in FIG. 2, a cross-sectional schematic diagram of A1-A2 in FIG. 1, the display device includes a pixel defining layer 121, green sub-pixels 113, an optical fingerprint sensor 12, an encapsulation layer 122, an insulating layer 123, touch control lines 13, and a flattening layer 124. The green sub-pixels 113 and the optical fingerprint sensor 12 herein are only illustrative, and the specific structures thereof are not shown. As can be seen in FIG. 2, when the green sub-pixels 113 located on both sides of the optical fingerprint sensor 12 emit light, the light 125 will be reflected by the touch control lines 13 to the optical fingerprint sensor 12. The operating principle of the optical fingerprint sensor 12 is to receive the light reflected from the finger for fingerprint identification, and therefore, the optical fingerprint sensor 12 is subjected to the interference of the light reflected from the touch control lines 13, resulting in a decrease in the signal-to-noise ratio of the optical fingerprint sensor 12, and a deterioration of the performance of the optical fingerprint sensor. Furthermore, the existing OLED display device has the technical problem that the touch wiring reflect the light emitted by the pixel units, resulting in a lower signal-to-noise ratio of the optical fingerprint sensor.

Embodiments of the present application provide, in response to the above technical problems, a display panel and a display device to improve the above technical problems.

Figure 3:
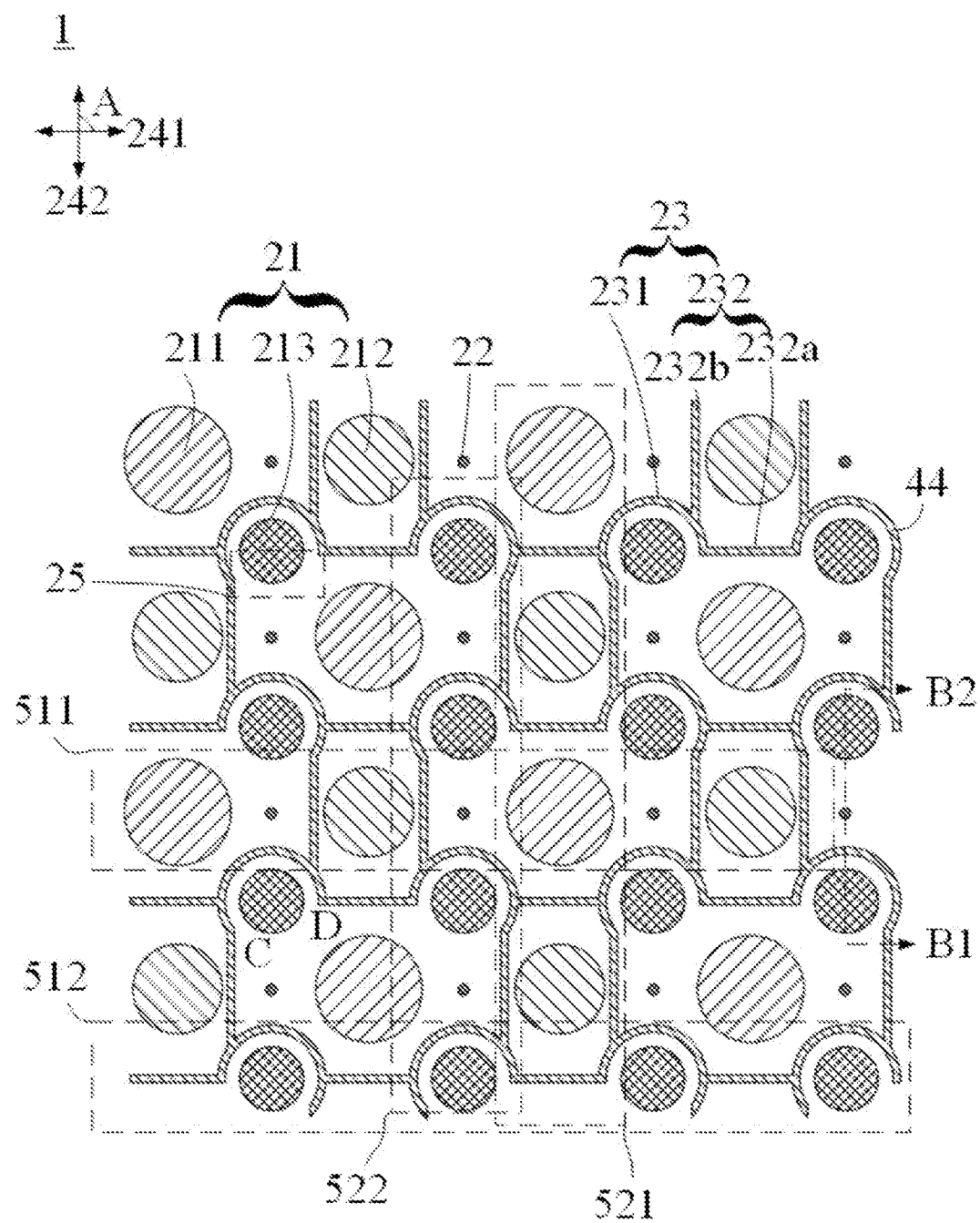
FIG. 3 is a first schematic diagram of a display panel disposed by embodiments of the present application.
Figure 4:
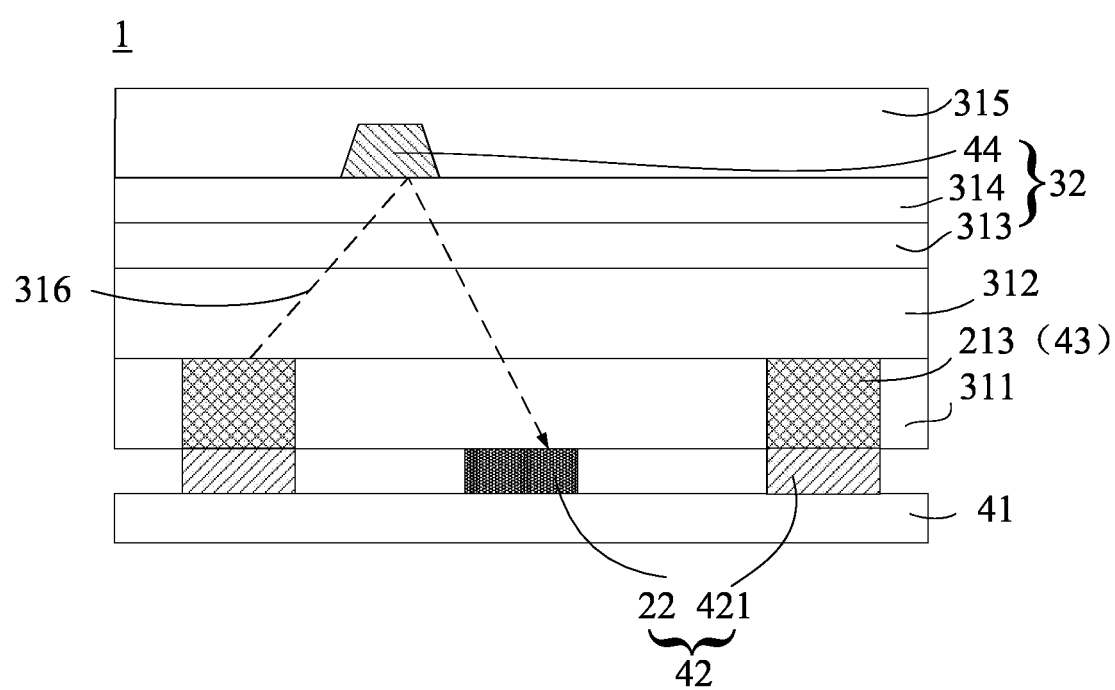
FIG. 4 is a B1-B2 cross-sectional diagram of the display panel of FIG. 3.

As shown in FIG. 3 and FIG. 4, embodiments of the present application provide a display panel including:

a substrate 41;

a driving circuit layer 42 disposed on a side of the substrate 41, in which the driving circuit layer 42 includes a plurality of driving circuits 421 and optical sensors 22 disposed between the driving circuits 421;

a light-emitting layer 43 disposed on a side of the driving circuit layer 42 away from the substrate 41, in which the light-emitting layer 43 includes a plurality of pixel units 21 disposed in an array, and the pixel units 21 are electrically connected to corresponding drive circuits 421; and a touch control layer 32 disposed on a side of the light-emitting layer 43 away from the substrate 41, in which the touch control layer 32 includes a plurality of touch electrodes 44 including touch patterns 23 disposed between the pixel units 21;

in which the plurality of the pixel units 21 include a plurality of first sub-pixel units 211, a plurality of second sub-pixel units 212, and a plurality of third sub-pixel units 213; the plurality of the first sub-pixel units 211 and the plurality of the second sub-pixel units 212 are alternately arranged in a first direction 241 to form a plurality of first pixel rows 511; the plurality of the first sub-pixel units 211 and the plurality of the second sub-pixel units 212 are all alternately arranged in a second direction 242 to form a plurality of first pixel columns 521, the plurality of the third sub-pixel units 213 are arranged in the first direction 241 to form a plurality of second pixel rows 512; the plurality of the third sub-pixel units 213 are arranged in the second direction 242 to form a plurality of second pixel columns 522; and the first direction 241 is intersected by the second direction 242. In practice, the first pixel rows 511 and the second pixel rows 512 may be arranged alternately in the second direction 242, and the first pixel columns 521 and the second pixel columns 522 may be arranged alternately in the first direction 241.

The optical sensors 22 are disposed in the first direction 241 between adjacent first sub-pixel units 211 and second sub-pixel units 212, and the optical sensors 22 are disposed in the second direction 242 between adjacent third sub-pixel units 213.

The touch patterns 23 are not disposed between the optical sensors 22 and at least one of adjacent first sub-pixel units 211 and second sub-pixel units 212 in the first direction 241.

The touch patterns 23 are not disposed between the optical sensors 22 and at least one of adjacent third sub-pixel units 213 in the second direction 242.

Embodiments of the present application provide a display panel, which, by not disposing a touch pattern between the optical sensors and at least one of adjacent third sub-pixel units, reduces the light reflected from the touch electrodes to the optical sensors when the third sub-pixel units emit light, reduces the interference of the light from the pixel units reflected from the touch electrodes to the optical sensors, and improves the signal-to-noise ratio of the optical sensors.

Specifically, as shown in FIG. 3, the touch patterns 23 include first line segments 231 disposed around the third sub-pixel units 213 and second line segments 232 connected to the first line segments, in which two ends of at least one of the first line segments 231 around the third sub-pixel units 213 are disconnected and form an opening 25 in a region between the third sub-pixel units 213 and the optical sensors 22. By making two ends of the first line segments of the touch units surrounding the third sub-pixel units disconnected and forming openings, and making the openings located in the region corresponding to the optical sensors and the third sub-pixel units. When the third sub-pixel units emit light, the presence of the openings reduces the amount of light reflected from the touch units to the optical sensors, reduces the interference of the light from the pixel units reflected from the touch units to the optical sensors, and improves the signal-to-noise ratio of the optical sensors.

Specifically, the touch patterns refer to a pattern of an electrode in the touch control layer, which may be electrodes or lines composed of a plurality of line segments in an actual product. The touch patterns, the touch electrodes, and the touch lines are interchangeable, and they are all conductive lines or conductive blocks acting as a touch control. The electrodes may be either touch electrodes or sensing electrodes. Depending on the different designs of the touch control layer, the design of the touch patterns is also different, which is not limited by the embodiments of the present application. Similarly, the design of the touch control layer is not limited in the embodiments of the present application. The electrodes in the touch control layer in the embodiments of the present application may be a self-compatible design or a mutual-compatible design. The touch control layer in the embodiments of the present application may include only a conductive film layer where the touch patterns are located, or it may include two conductive film layers, including a film layer where the touch patterns are located and a bridging layer, which is not limited in the embodiments of the present application.

Specifically, based on different designs of the touch control layer, the schematic design of the localized part of the display region of the display panel disposed by the embodiments of the present application may be the same as or different from the design of the entire surface of the display region of the display panel. For example, if the touch control layer includes only one conductive layer, the design of the localized part of the display region of the display panel disposed by the embodiments of the present application is the same as the design of the entire surface of the display region, and only the connecting lines connected to the touch chip is not shown. For example, when the touch control layer includes two conductive layers, the embodiments of the present application only show the design of the touch patterns at a single touch electrode, and the embodiments of the present application do not limit the design of the other electrode and the design of the bridge connection. It can be understood that the touch electrodes include driving electrodes and sensing electrodes, and the driving electrodes and the sensing electrodes can both be adopted in the design described in the above-described embodiments, with one of the driving electrodes and the sensing electrodes being disposed on the entire surface, and the other being connected at the connection of the two electrodes by transferring lines through the bridging layer.

Specifically, in the accompanying drawings in the embodiments of the present application, an angle A between the first direction 241 and the second direction 242 is 90 degrees, which is taken as an example for illustration. But embodiments of the present application are not limited thereto, the angle A between the first direction 241 and the second direction 242 may be an acute angle.

Specifically, the first direction may be transverse and the second direction may be longitudinal direction, or the first direction may be longitudinal direction and the second direction may be transverse.

Specifically, as shown in FIG. 3 and FIG. 4, it can be seen that the first line segments 231 surrounding the third sub-pixel units 213 have an opening 25 on the lower side, and there are no openings between the third sub-pixel units 213 and the optical sensors 22 on the lower side, so that when the third sub-pixel units 213 emit light, the light emitted from the third sub-pixel units 213 on the optical sensors 22 will not be reflected by the touch wiring, which reduces the amount of light 316 reflected by the touch wiring to the optical sensors 22, reducing the interference of the light from the pixel units reflected by the touch wiring to the optical sensors, and improving the signal-to-noise ratio of the optical sensors.

Specifically, as shown in FIG. 1 and FIG. 3, it can be seen that the embodiments of the present application remove a portion of the touch patterns, but the touch patterns are still connected together, and there are no broken lines that can cause the failure of transmission of electrical signals.

Specifically, as shown in FIG. 4, it can be seen that in two third sub-pixel units 213 located on both sides of an optical sensor 22. There are line segments of the touch patterns 23 disposed between a third sub-pixel unit 213 and the optical sensor 22, so that the light emitted by the third sub-pixel unit 213 is reflected to the optical sensor 22 on the left side. There are no line segments of the touch patterns 23 disposed between another third sub-pixel unit 213 and the optical sensor 22 on the right side, so that the light emitted by the third sub-pixel unit 213 is not reflected to the optical sensor 22, thereby reducing the amount of light reflected from the touch patterns 23 to the optical sensors 22 and improving the signal-to-noise ratio of the optical sensors. In some embodiments, an opening is disposed in a first line segment surrounding the third sub-pixel units.

In some embodiments, in a touch electrode, the touch patterns are not disposed between the optical sensors and the third sub-pixel units adjacent to their first side in a second pixel column; and in an adjacent second pixel column, the touch patterns are also not disposed between the optical sensors and the third sub-pixel units adjacent to their first side.

In some embodiments, in a touch electrode, the touch patterns are not disposed between the optical sensors and the third sub-pixel units adjacent to their first side in a second pixel column; and in an adjacent second pixel column, the touch patterns are not disposed between the optical sensors and the third sub-pixel units adjacent to their second side, the first side is different from the second side.

In some embodiments, an area of the first sub-pixel units is greater than an area of the second sub-pixel units,
in the first pixel rows, the touch patterns are not disposed between the optical sensors and the first sub-pixel units adjacent to them, and the touch patterns are disposed between the optical sensors and the second sub-pixel units adjacent to them.

In some embodiments, an area of the first sub-pixel units is greater than an area of the second sub-pixel units,
in the first pixel rows, the touch patterns are not disposed between the optical sensors and the second sub-pixel units adjacent to them, and the touch patterns are disposed between the optical sensors and the first sub-pixel units adjacent to them.

In some embodiments, an area of the first sub-pixel units is greater than an area of the second sub-pixel units,
in a first pixel column, the touch patterns are not disposed between the optical sensors and the first sub-pixel units adjacent to them, and the touch patterns are not disposed between the optical sensors and the second sub-pixel units adjacent to them; in an adjacent second pixel column, the touch patterns are disposed between the optical sensors and the first sub-pixel units adjacent to them, and the touch patterns are disposed between the optical sensors and the second sub-pixel units adjacent to them.

In some embodiments, the touch patterns are disposed between the first sub-pixel units and the second sub-pixel units in a first pixel column.

In some embodiments, the touch patterns include first line segments disposed around the third sub-pixel units and second line segments connected to the first line segments, two ends of at least one of the first line segments around the third sub-pixel units are disconnected and form an opening in a region between the third sub-pixel units and the optical sensors.

In some embodiments, a first end of a first line segment is connected to an end of a second line segment, and a second end of the first line segment is connected to an end of another second line segment.

In some embodiments, a first end of a first line segment is connected to an end of a second line segment, and an end of another second line segment is connected to a first point on the first line segment. A width from the first point on the first line segment to the second end of the first line segment is greater than 0.

In some embodiments, a second line segment is connected to a second point of a first line segment, and another second line segment is connected to a third point on the first line segment. A portion between the second point on the first line segment and any one end of the first line segment has a width greater than 0, and a portion between the third point on the first line segment and any one end of the first line segment has a width greater than 0.

In response to the technical problem that a single first line segment surrounding the third sub-pixel units with openings would have still more light reflected to the optical sensors, in some embodiments, as shown in FIG. 3, a plurality of the first line segments 231 surrounding the third sub-pixel units 213 are disposed with openings 25 in the region between the third sub-pixel units 213 and the optical sensors 22. By disposing the plurality of first line segments with openings formed on the region between the third sub-pixel units and the optical sensors, the light reflected from the touch patterns to the optical sensors can be further reduced, and the signal-to-noise ratio of the optical sensors can be further improved.

Specifically, a plurality of first line segments surrounding the third sub-pixel units include two first line segments surrounding the third sub-pixel units, or three first line segments surrounding the third sub-pixel units, but the embodiments of the present application are not limited thereto, and the plurality may be any value greater than or equal to two.

In some embodiments, as shown in FIG. 3, a plurality of the openings 25 are located on the same side of a plurality of the third sub-pixel units 213 in a region between the third sub-pixel units 213 and the optical sensors 22. By disposing the plurality of openings located on the same side of the plurality of third sub-pixel units, the reflected light of the touch patterns received by each optical sensor is disposed from the same side, which facilitates the processing of the reflected light of the touch patterns during the subsequent processing to reduce the interference of the light of the pixel units reflected from the touch patterns on the optical sensors, and to improve the signal-to-noise ratio of the optical sensors.

Specifically, as shown in FIG. 3, it is feasible to locate all openings 25 on the same side of all third sub-pixel units 213.

Figure 5:
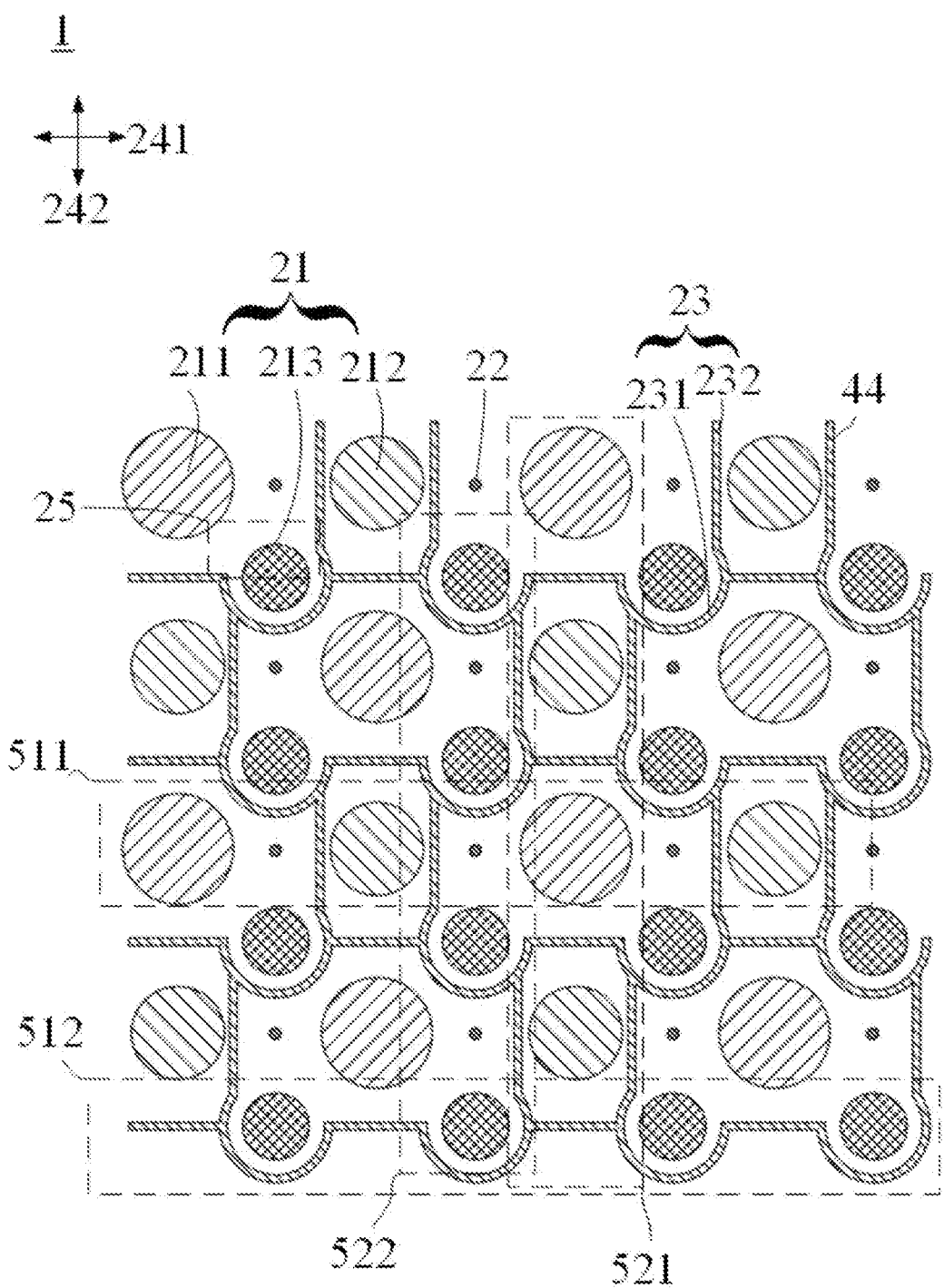
FIG. 5 is a second schematic diagram of a display panel disposed by embodiments of the present application.

In some embodiments, as shown in FIG. 3 and FIG. 5, in a touch electrode 44, in a second pixel column 522, there are no complete touch patterns 23 disposed between the optical sensors 22 and an adjacent third sub-pixel unit 213 on its first side (lower side in FIG. 3); and in an adjacent the second pixel column 522, there are also no touch patterns 23 disposed between the optical sensors 22 and an adjacent third sub-pixel unit 213 on its first side (lower side in FIG. 3). By disposing one side the same, and there are no touch patterns disposed between each optical sensor and the adjacent third sub-pixel unit on the side, the reflected light of the touch patterns received by each optical sensor is disposed from the same side, which facilitates the processing of the reflected light of the touch patterns during the subsequent processing to reduce the interference of the light of the pixel units reflected from the touch patterns on the optical sensors, and to improve the signal-to-noise ratio of the optical sensors.

Specifically, the first side may be an upper side, or the first side may be a lower side.

Specifically, as shown in FIG. 3, in each second pixel column 522, the touch patterns 23 are not disposed between the optical sensors 22 and an adjacent third sub-pixel unit 213 on its lower side.

Specifically, as shown in FIG. 5, in each second pixel column 522, the touch patterns 23 are not disposed between the optical sensors 22 and an adjacent third sub-pixel unit 213 on its upper side.

In some embodiments, as shown in FIG. 5, in the second direction 242, the openings 25 are disposed between the third sub-pixel units 213 and the optical sensors 22 located in the previous row of the third sub-pixel units 213. By disposing the openings to be located between the third sub-pixel units and the optical sensors located in the previous row of the third sub-pixel units, the reflection of the light from the third sub-pixel units under the optical sensors by the touch patterns can be reduced, and the interference of the light from the pixel units reflected by the first line segments of the touch patterns with the optical sensors can be reduced, while the signal-to-noise ratio of the optical sensors can be improved.

Specifically, all openings 25 may be disposed between the third sub-pixel units 213 and the optical sensors 22 located in the previous row of the third sub-pixel units 213.

In some embodiments, as shown in FIG. 3, in the second direction 242, the openings 25 are disposed between the third sub-pixel units 213 and the optical sensors 22 located in the next row of the third sub-pixel units 213. By disposing the openings to be located between the third sub-pixel units and the optical sensors located in the next row of the third sub-pixel units, the reflection of the light from the third sub-pixel units on the optical sensors by the touch patterns can be reduced, and the interference of the light from the pixel units reflected by the first line segments of the touch patterns with the optical sensors can be reduced, and the signal-to-noise ratio of the optical sensors can be improved.

Specifically, all openings 25 may be disposed between the third sub-pixel units 213 and the optical sensors 22 located in the next row of the third sub-pixel units 213.

Figure 11:
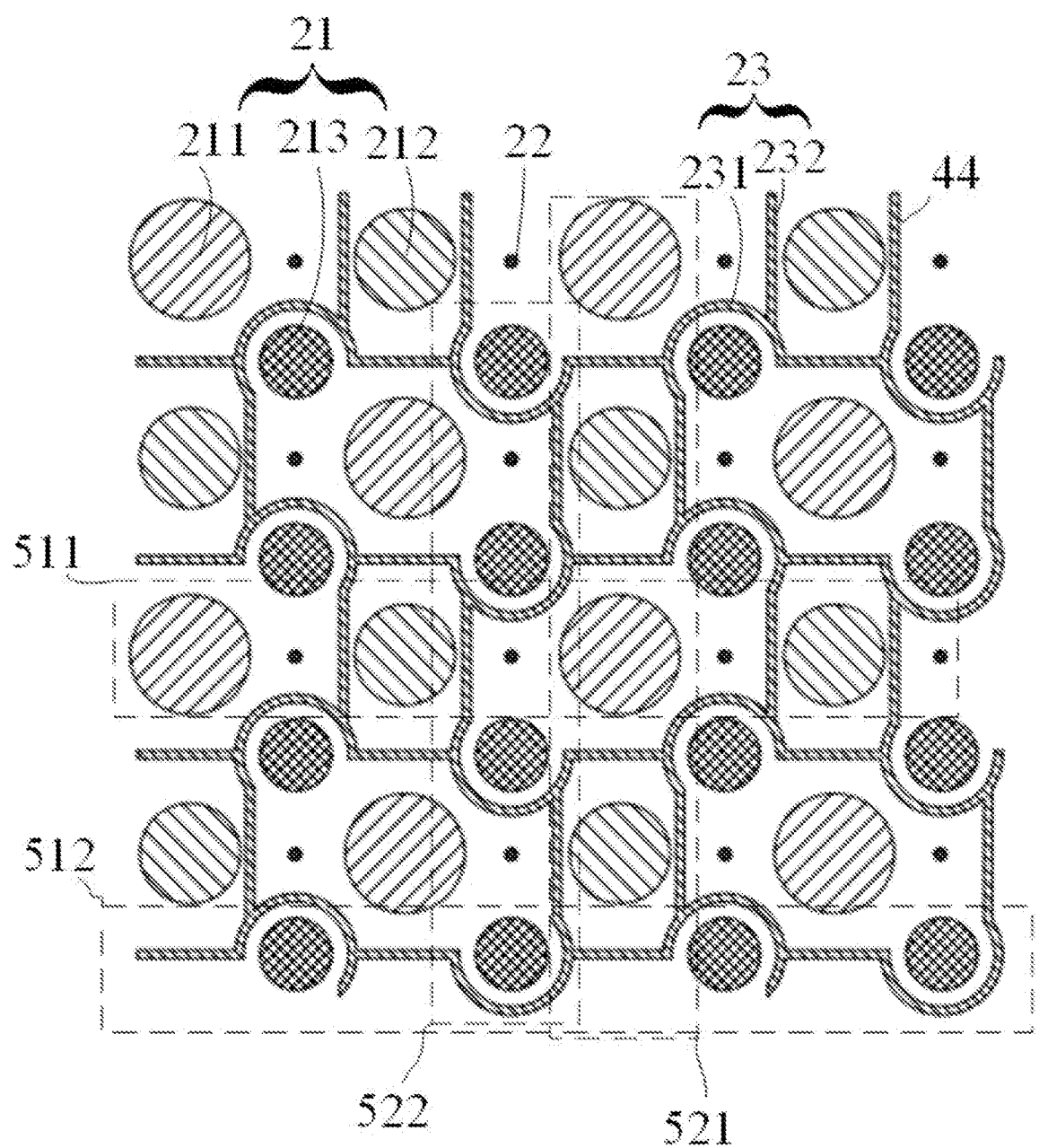
FIG. 11 is an eighth schematic diagram of a display panel disposed by embodiments of the present application.

In some embodiments, as shown in FIG. 11, in a touch electrode 44, in a second pixel column 522, there are no touch patterns 23 disposed between the optical sensors 22 and an adjacent third sub-pixel unit 213 on its first side (for example, the upper side). In an adjacent second pixel column 522, there are no touch patterns 23 disposed between the optical sensors 22 and an adjacent third sub-pixel unit 213 on its second side (for example, the lower side), the first side is opposite to the second side. By not disposing touch patterns between the optical sensors and the third sub-pixel units in different directions, the reflection of the light from the third sub-pixel units in different directions of the optical sensors by the touch patterns can be reduced, the interference of the light from the pixel units reflected by the touch patterns to the optical sensors can be reduced, and the signal-to-noise ratio of the optical sensors can be improved.

Specifically, as shown in FIG. 11, it can be seen that in the first column of second pixel columns 522, there are no touch patterns 23 disposed between the optical sensors 22 and an adjacent third sub-pixel unit 213 on its lower side, and in the second column of second pixel columns 522, there are no touch patterns 23 disposed between the optical sensors 22 and an adjacent third sub-pixel unit 213 on its upper side.

Figure 6:
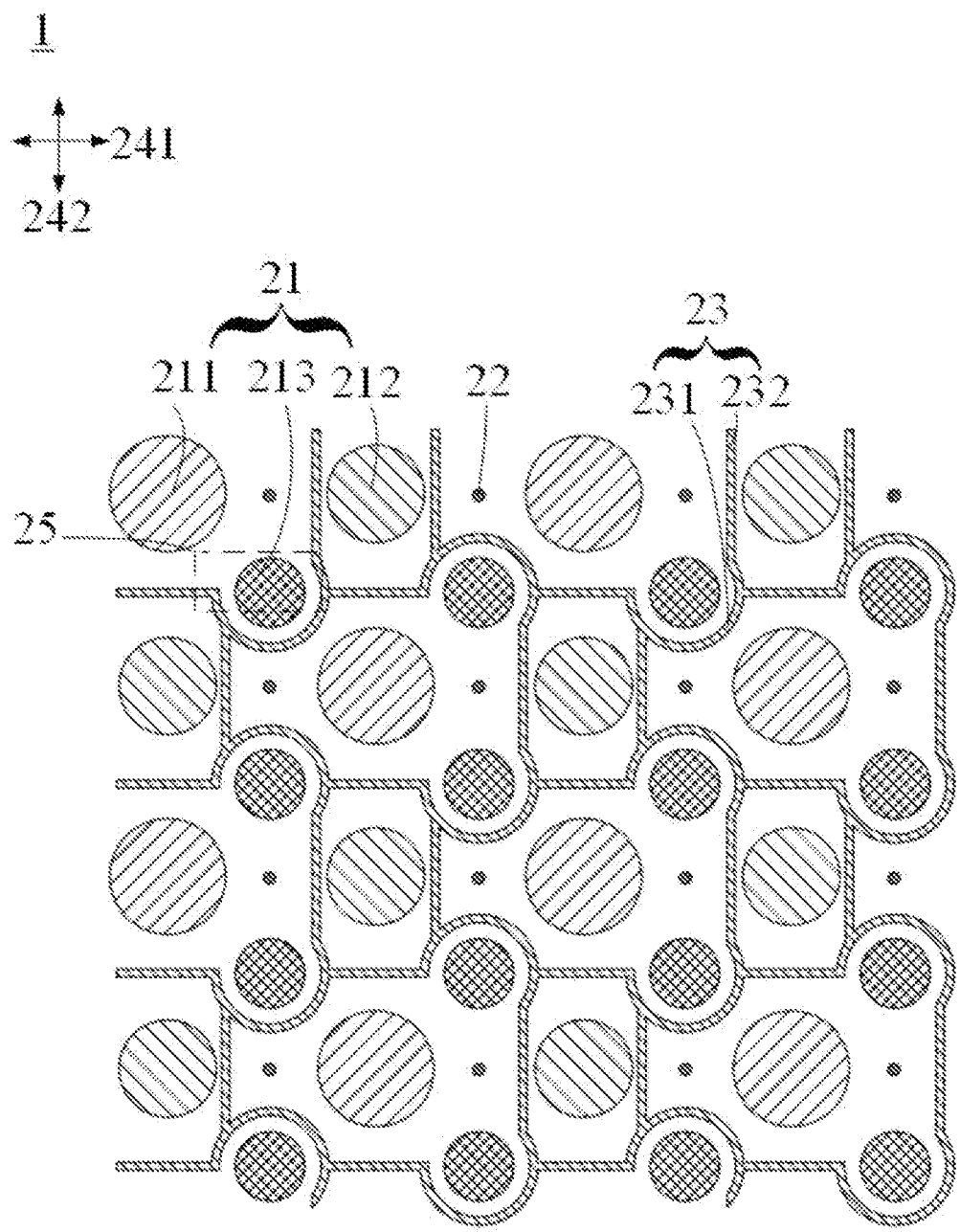
FIG. 6 is a third schematic diagram of a display panel disposed by embodiments of the present application.

In some embodiments, as shown in FIG. 6, a plurality of the openings 25 are located on different sides of a plurality of the third sub-pixel units 213 in a region between the third sub-pixel units 213 and the optical sensors 22. By disposing the openings on different sides of the third sub-pixel units, the reflection of the light from the third sub-pixel units in different directions of the optical sensors by the touch patterns can be reduced, the interference of the light from the pixel units reflected by the touch patterns to the optical sensors can be reduced, and the signal-to-noise ratio of the optical sensors can be improved.

Specifically, as shown in FIG. 6, in the second direction 242, it can be seen that portions of the openings 25 are disposed on the upper side of the third sub-pixel units 213, i.e., portions of the openings 25 are disposed between the third sub-pixel units 213 and the optical sensors 22 located on the previous row of the third sub-pixel units 213, and portions of the openings 25 are disposed on the lower side of the third sub-pixel units 213, i.e., portions of the openings 25 are disposed between the third sub-pixel units 213 and the optical sensors 22 located on the next row of the third sub-pixel units 213, which can reduce the reflection of the touch patterns to the light of the third sub-pixel units above portions of the optical sensors, and reduce the reflection of the touch patterns to the light of the third sub-pixel units below portions of the optical sensors, so that the interference of the light of the pixel units reflected by the touch patterns to the optical sensors can be reduced, and the signal-to-noise ratio of the optical sensors can be improved.

Specifically, as shown in FIG. 6, in a column of third sub-pixel units 213, along the second direction 242, portions of the openings 25 are located between the third sub-pixel units 213 and the optical sensors 22 located in the previous row of the third sub-pixel units 213, and portions of the openings 25 are located between the third sub-pixel units 213 and the optical sensors 22 located in the next row of the third sub-pixel units 213, such that, in a column of the optical sensors 22, some of the optical sensors 22 do not have touch patterns on both sides, the optical sensors will not be interfered with by the reflected light from the touch patterns to the third sub-pixel units, and some of the optical sensors 22 are disposed with touch patterns on both sides. However, this embodiment can still reduce the interference of the light from the pixel units reflected by the touch patterns to the optical sensors and improve the signal-to-noise ratio of the optical sensors.

Specifically, it is also feasible that in two adjacent rows of third sub-pixel units 213, along the second direction 242, all openings 25 are disposed between the third sub-pixel units 213 and the optical sensors 22 located on the previous row of the third sub-pixel units 213 in a row of third sub-pixel units 213, and all openings 25 are disposed between the third sub-pixel units 213 and the optical sensors 22 located on the next row of the third sub-pixel units 213 in another row of third sub-pixel units 213, so that a column of optical sensors does not receive reflection of light from the touch patterns to the third sub-pixel units below portions of the optical sensors, a column of optical sensors does not receive reflection of light from the touch patterns to the third sub-pixel units above portions of the optical sensors, thus reducing the interference of the light of the pixel units reflected by the touch patterns to the optical sensors, and improving the signal-to-noise ratio of the optical sensors.

In some embodiments, as shown in FIG. 3, an area of the first sub-pixel units 211 is greater than an area of the second sub-pixel units 212, in the first pixel rows 511, the touch patterns 23 are not disposed between the optical sensors 22 and the first sub-pixel units 211 adjacent to them, and the touch patterns 23 are disposed between the optical sensors 22 and the second sub-pixel units 212 adjacent to them. By not disposing touch patterns between the optical sensors and their neighboring first sub-pixel units, it is feasible to prevent the spacing between the optical sensors and the first sub-pixel units being too small resulting in the touch patterns interfering with other structures, and interference with the optical sensors by light from the first sub-pixel units reflected by the touch patterns can be avoided.

Specifically, as shown in FIG. 3, the second line segments 232 include first subsegments 232a disposed along the first direction 241 and second subsegments 232b disposed along the second direction 242, the second subsegments 232b are located between the optical sensors 22 and the second sub-pixel units 212 in the first direction 241, and the first subsegments 232a are located between the first sub-pixel units 211 and the second sub-pixel units 212 in the second direction 242. By disposing the second subsegments between the optical sensors and the second sub-pixel units in the first direction, interference with the optical sensors by light from the first sub-pixel units reflected by the touch patterns can be avoided.

Figure 9:
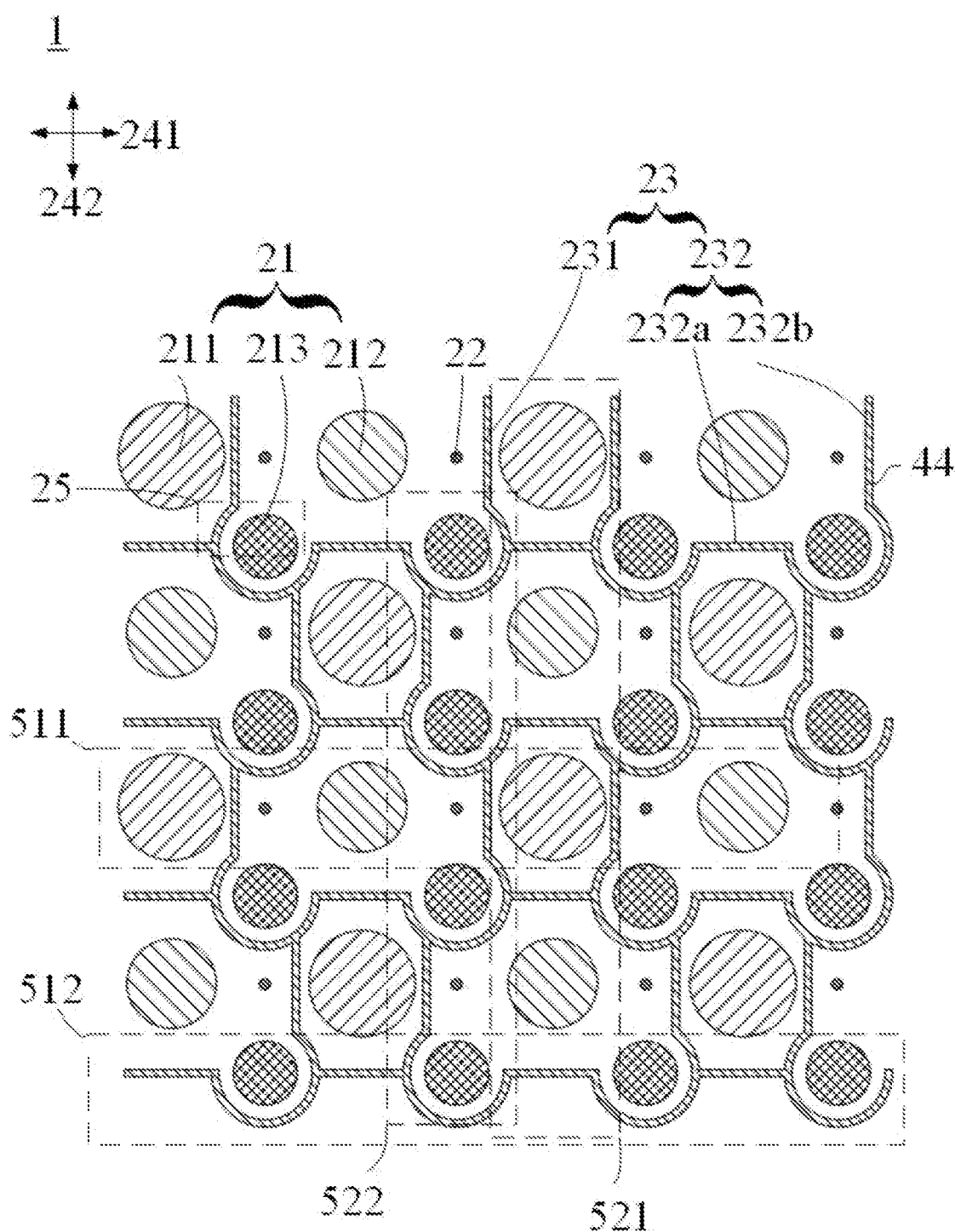
FIG. 9 is a sixth schematic diagram of a display panel disposed by embodiments of the present application.

In some embodiments, as shown in FIG. 9, an area of the first sub-pixel units 211 is greater than an area of the second sub-pixel units 212, in the first pixel rows 511, the touch patterns 23 are not disposed between the optical sensors 22 and the second sub-pixel units 212 adjacent to them, and the touch patterns are disposed between the optical sensors 22 and the first sub-pixel units 211 adjacent to them. By not disposing touch patterns between the optical sensors and the second sub-pixel units, interference with the optical sensors by light from the second sub-pixel units reflected by the touch patterns can be avoided.

Specifically, as shown in FIG. 9, the second line segments 232 include first subsegments 232a disposed along the first direction 241 and second subsegments 232b disposed along the second direction 242, the second subsegments 232b are located between the optical sensors 22 and the first sub-pixel units 211 in the first direction 241, and the first subsegments 232a are located between the first sub-pixel units 211 and the second sub-pixel units 212 in the second direction 242. By disposing the second subsegments between the optical sensors and the first sub-pixel units in the first direction, interference with the optical sensors by light from the second sub-pixel units reflected by the touch patterns can be avoided.

Figure 10:
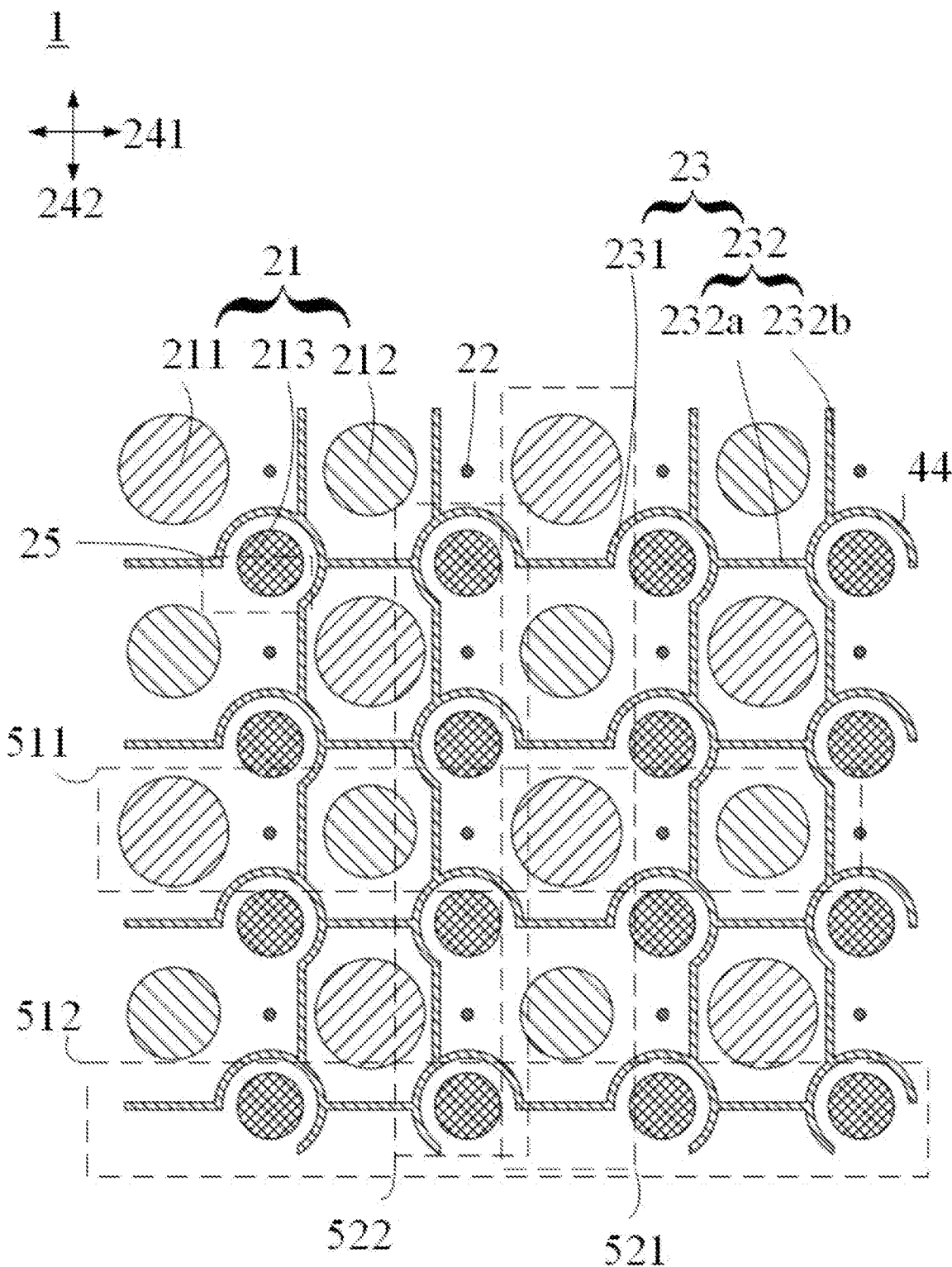
FIG. 10 is a seventh schematic diagram of a display panel disposed by embodiments of the present application.

In some embodiments, as shown in FIG. 10, an area of the first sub-pixel units 211 is greater than an area of the second sub-pixel units 212, in a first pixel column 521, the touch patterns 23 are not disposed between the optical sensors 22 and the first sub-pixel units 211 adjacent to them, and the touch patterns 23 are not disposed between the optical sensors 22 and the second sub-pixel units 212 adjacent to them; in an adjacent second pixel column 522, the touch patterns 23 are disposed between the optical sensors 22 and the first sub-pixel units 211 adjacent to them, and the touch patterns 23 are disposed between the optical sensors 22 and the second sub-pixel units 212 adjacent to them.

Specifically, as shown in FIG. 10, the second line segments 232 include first subsegments 232a disposed along the first direction 241 and second subsegments 232b disposed along the second direction 242, a portion of the second subsegments 232b is located between the optical sensors 22 and the first sub-pixel units 211, and a portion of the second subsegments 232b is located between the optical sensors 22 and the first sub-pixel units 211 in the first direction 241, and the first subsegments 232a are located between the first sub-pixel units 211 and the second sub-pixel units 212 in the second direction 242. By disposing a portion of the second subsegments between the optical sensors and the second sub-pixel units and disposing a portion of the second subsegments between the optical sensors and the first sub-pixel units in the first direction, interference with the optical sensors by light reflected from a portion of the first sub-pixel units and a portion of the second sub-pixel units by the touch patterns can be avoided.

Specifically, the second line segments 232 disposed along the second direction 242 are illustrated in FIG. 10 as an example of being disposed in the same column in two adjacent columns, but the embodiments of the present application are not limited to this, e.g., the second subsegments 232b may be disposed in different columns in two adjacent columns in the first direction 241 and a portion of the second subsegments 232b is located between the optical sensors 22 and the second sub-pixel units 212, a portion of the second subsegments 232b is located between the optical sensors 22 and the first sub-pixel units 211.

In some embodiments, as shown in FIG. 3, in a first pixel column 521, the touch patterns 23 are disposed between the first sub-pixel units 211 and the second sub-pixel units 212. By disposing touch patterns between the first sub-pixel units and the second sub-pixel units, it is feasible to connect the parts of the touch patterns together.

In some embodiments, as shown in FIG. 3 and FIG. 5 (the first end C and the second end D are not identified in FIG. 5), the first end C of the first line segments 231 is connected to an end of a second line segment 232, and the second end D of the first line segments 231 is connected to an end of another second line segment 232, by connecting two ends of the first line segments 231 to two ends of two second line segments respectively, the ends of the first line segments 231 can be avoided to extend out of the connection between the first line segments 231 and the second line segments 232, and the problem of tip discharge of the touch patterns can be avoided.

Specifically, as shown in FIG. 3 and FIG. 5, a portion of the first line segments 231 in the touch patterns 23 may be connected to three second line segments 232, and a portion of the first line segments 231 may be connected to four second line segments 232, but two disconnected ends of whichever of the first line segments 231 are connected to the second line segments 232, and the embodiments of the present application make the two ends of the first line segments 231 not dangling, which avoids the touch patterns from occurring the problem of tip discharge, and improves the yield of the display panel.

Specifically, the positions of the first end C and the second end D can be switched.

Figure 7:
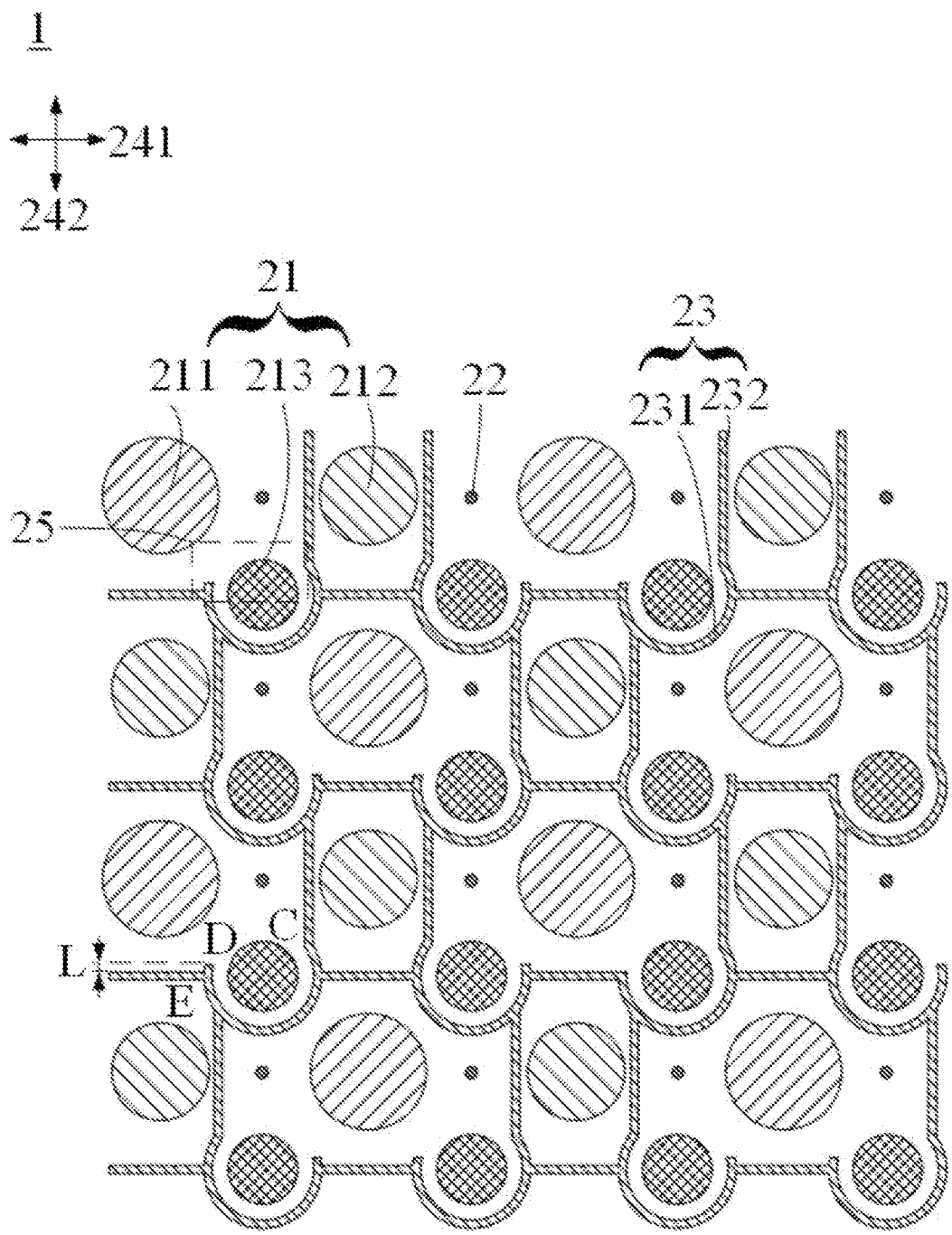
FIG. 7 is a fourth schematic diagram of a display panel disposed by embodiments of the present application.

In some embodiments, as shown in FIG. 7, the first end C of the first line segments 231 is connected to an end of a second line segment 232, an end of another second line segment 232 is connected to a first point E on the first line segments 231, and a width L from the first point E on the first line segments 231 to a second end D of the first line segments 231 is greater than 0. By connecting an end of the first line segments to an end of the second line segments and overhanging the other end of the first line segments, the touch patterns located between the third sub-pixel units and the optical sensors are disposed with openings and the width of the touch patterns located between the third sub-pixel units and the optical sensors is reduced in the event of a process limitation or process error, so as to reduce the interference of the light of the pixel units reflected from the touch patterns with the optical sensors, and to improve the signal-to-noise ratio of the optical sensors. Moreover, the problem that the first line segments and the second line segments are disconnected and the signal cannot be transmitted due to a process error can be prevented.

Specifically, as shown in FIG. 7, it can be seen that among the two ends of the first line segments 231, the first end C of the first line segments 231 is connected to an end of a second line segment 232, the other end of the first line segments 231 is overhanging, and the first point E on the first line segments 231 is connected to another second line segment to prevent disconnection, the overhanging of the other end of the first line segments prevents the problem that the connection between the first line segments and the second line segments is disconnected causing the signals unable to be transmitted.

Specifically, as shown in FIG. 7, it can be seen that in a column of third sub-pixel units 213, the left end of some of the first line segments 231 is overhanging, and the right end of some of the first line segments 231 is overhanging, but the embodiments of the present application are not limited to this, for example, all of the left ends of the first line segments are overhanging, or all of the right ends of the first line segments are overhanging, or the left ends of a row of the first line segments are overhanging, and the right ends of a row of the first line segments are overhanging. And in FIG. 7, all of the first line segments have one end overhanging, but embodiments of the present application are not limited to this, only some of the first line segments may have one end overhanging.

Figure 8:
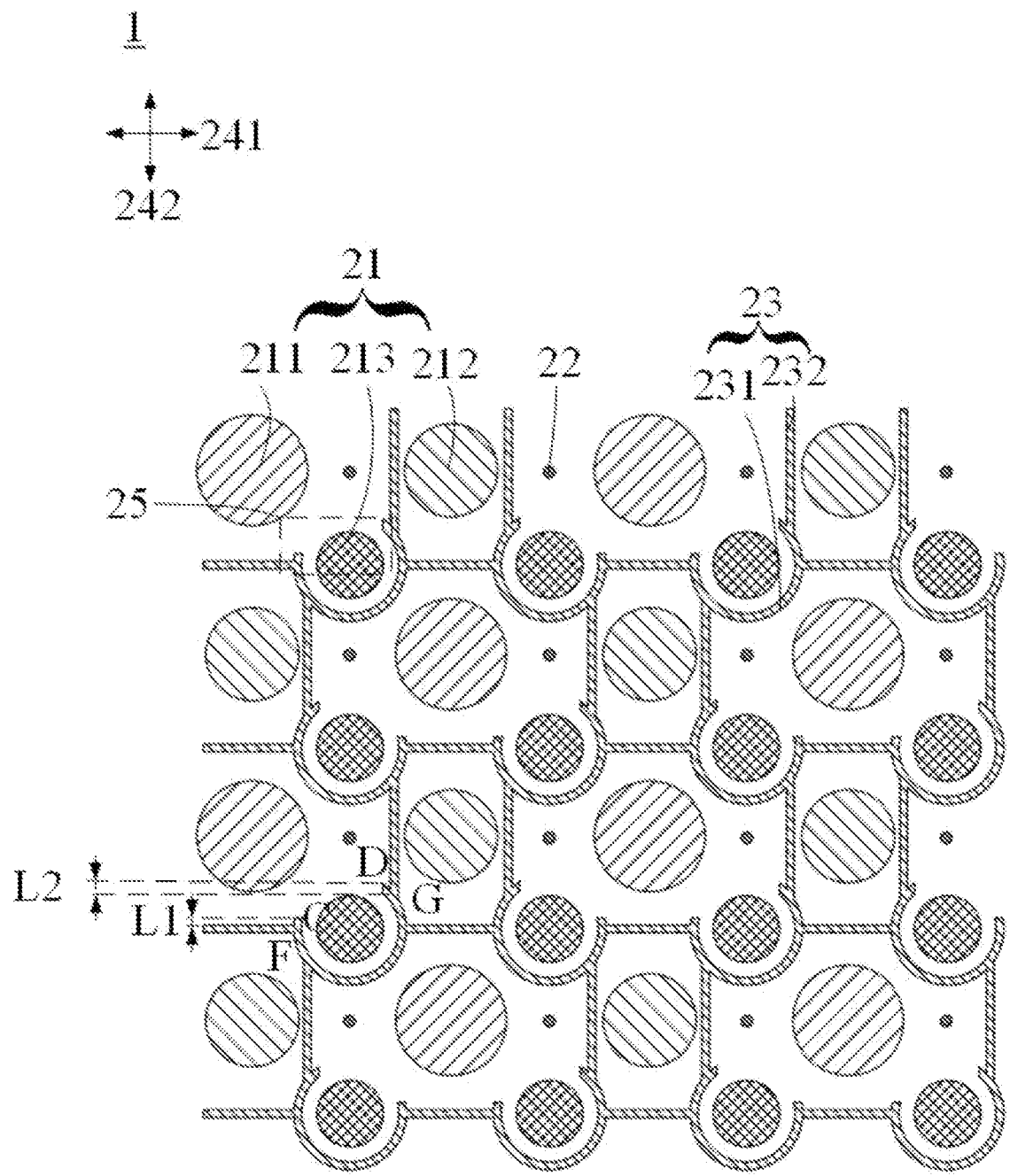
FIG. 8 is a fifth schematic diagram of a display panel disposed by embodiments of the present application.

In some embodiments, as shown in FIG. 8, a second line segment 232 is connected to a second point F on the first line segments 231, the other end the second line segment 232 is connected to a third point G on the first line segments 231, and a width L1 between the second point F on the first line segments 231 and either end (e.g., the first end C) of the first line segments 231 is greater than 0 and a width L2 between the third point G on the first line segments 231 and either end (e.g., the first end D) of the first line segments 231 is greater than 0. By overhanging two ends of the first line segments, the touch patterns located between the third sub-pixel units and the optical sensors are disposed with openings and the width of the touch patterns located between the third sub-pixel units and the optical sensors is reduced in the event of a process limitation or process error, so as to reduce the interference of the light of the pixel units reflected from the touch patterns with the optical sensors, and to improve the signal-to-noise ratio of the optical sensors. Moreover, the problem that the first line segments and the second line segments are disconnected and the signal cannot be transmitted due to a process error can be prevented.

Specifically, as shown in FIG. 8, it can be seen that both ends of the first line segments 231 are overhanging, a second point F on the first line segments 231 is connected to a second line segment to prevent disconnection, and a third point G on the first line segments 231 is connected to another second line segment to prevent disconnection, in addition, the overhanging of two ends of the first line segments can prevent disconnection of a connection between the first line segments and the second line segments from resulting in the problem that the signals cannot be transmitted.

Specifically, as shown in FIG. 8, it can be seen that in the first line segments 231 surrounding all the third sub-pixel units 213, two ends of all the first line segments 231 are overhanging, but embodiments of the present application are not limited to this, and only some of the first line segments 231 may be overhanging at both ends.

In some embodiments, the color of the light emitted by the first sub-pixel units is blue, the color of the light emitted by the second sub-pixel units is red, and the color of the light emitted by the third sub-pixel units is green, but the embodiments of the present application are not limited thereto. For example, the light-emitting color of the first sub-pixel units may be red or green, the light-emitting color of the second sub-pixel units may be blue or green, and the light-emitting color of the third sub-pixel units may be red or blue.

In some embodiments, a positive projection area of the first sub-pixel units is larger than a positive projection area of the second sub-pixel units, and a positive projection area of the second sub-pixel units is larger than a positive projection area of the third sub-pixel units. For the different luminous efficiency of each sub-pixel unit, the positive projection areas of each sub-pixel unit can be different, so that the luminous effect of each sub-pixel unit within the pixel units is the same, by disposing sub-pixel units of different sizes.

In some embodiments, as shown in FIG. 4, the display panel 1 includes a pixel defining layer 311, an encapsulation layer 312, a flattening layer 315, and the touch control layer 32 may include a first insulating layer 313, a second insulating layer 314, and touch electrodes 44. Specifically, the display panel includes an OLED display panel.

Specifically, the embodiments of the present application do not limit the specific structures of each sub-pixel unit, and each sub-pixel unit may include a pixel electrode layer, a light-emitting layer, and a common electrode layer, and may include a thin-film transistor array layer for controlling the sub-pixel units.

Specifically, the cross-sectional views in the other accompanying drawings can be referenced in the cross-sectional schematic drawings of FIG. 3 and FIG. 4, and will not be repeated herein.

Specifically, the above embodiments illustrate the design of the display panel in terms of the number of openings, the positions of the openings, the provision of two ends of the first line segments, and the provision of the second line segments, respectively, and it is to be understood that when there is no conflict between the embodiments, it is feasible to combine the embodiments, for example, in a certain embodiment, some of the first line segments may adopt the design shown in FIG. 3, some of the first line segments may adopt the design shown in FIG. 5, some of the first line segments may adopt the design shown in FIG. 6, some of the first line segments may adopt the design shown in FIG. 7, some of the first line segments may adopt the design shown in FIG. 8, some of the second line segments may adopt the design shown in FIG. 8, some of the second line segments may adopt the design shown in FIG. 9, some of the second line segments may adopt the design shown in FIG. 10. That is, the embodiments of the present application may include a combination of any plurality of embodiments.

Specifically, the structure shown in FIG. 1 and the structure shown in FIG. 3 are compared as an example of the display panel, respectively, and the following Table 1 is obtained.

TABLE 1

Comparison of signal-to-noise ratios of optical sensors of different display panels

| | Display panel shown in FIG. 1 | | | | Display panel shown in FIG. 3 | | |
|---|---|---|---|---|---|---|---|
| Signal source | DOT noise (S1) | Internal noise (S2) | noise + signal (S3) | Signal source | DOT noise (S1) | Internal noise (S2) | noise + signal (S3) |
| Received intensity | 8.78e−05 | 1.07e−04 | 2.55e−04 | Received intensity | 4.55e−05 | 6.36e−05 | 2.55e−04 |
| Signal-to-noise ratio | SNR = (S3 − S2)/S2 = 1.38 | | | Signal-to-noise ratio | SNR = (S3 − S2)/S2 = 3.01 | | |

As can be seen from Table 1, the DOT noise represents the noise brought by the light of the pixel units reflected by the touch patterns, the internal noise refers to the noise brought by the other structures, and the noise+signal represents the sum of all the noises as well as the effective signals of the optical sensors, and it can be understood that, since the present application removes some of the touch patterns, the noise caused by the other structures through the touch patterns is reduced, therefore, the internal noise of the display panel shown in FIG. 3 is reduced, and as can be seen from Table 1, the noise caused by the light of the pixel units reflected by the touch patterns in the present application is reduced compared to the noise caused by the light of the pixel units reflected by the touch patterns of the display panel shown in FIG. 1, and as can be seen from the signal-to-noise ratio SNR, the signal-to-noise ratio of the optical sensors of the display panel shown in FIG. 1 is 1.38, and the signal-to-noise ratio of the optical sensors of the display panel shown in FIG. 3 of the present application is 3.01, which improves the signal-to-noise ratio of the optical sensors of the embodiments of the present application.

Moreover, embodiments of the present application provide a display device including a display panel as described in any one of the above embodiments.

According to the above embodiments, the following can be seen.

The embodiments of the present application provide a display panel and a display device. The display panel includes a substrate, a driving circuit layer, a light-emitting layer, and a touch control layer, in which the driving circuit layer is disposed on a side of the substrate; the driving circuit layer includes a plurality of driving circuits and optical sensors disposed between the driving circuits; the light-emitting layer is disposed on a side of the driving circuit layer away from the substrate; the light-emitting layer includes a plurality of pixel units disposed in an array, the pixel units are electrically connected to corresponding drive circuits; the touch control layer is disposed on a side of the light-emitting layer away from the substrate; the touch control layer includes a plurality of touch electrodes, in which the touch electrodes include touch patterns disposed between the pixel units, the plurality of pixel units include a plurality of first sub-pixel units, a plurality of second sub-pixel units, and a plurality of third sub-pixel units; the plurality of first sub-pixel units and the plurality of second sub-pixel units are alternately arranged in a first direction to form a plurality of first pixel rows, the plurality of first sub-pixel units and the plurality of second sub-pixel units are all alternately arranged in a second direction to form a plurality of first pixel columns, the plurality of third sub-pixel units are arranged to form a plurality of second pixel rows in the first direction, the plurality of third sub-pixel units are arranged to form a plurality of second pixel columns in the second direction; the first direction intersects the second direction, the optical sensors are disposed between adjacent first sub-pixel units and second sub-pixel units in the first direction, the optical sensors are disposed between adjacent third sub-pixel units in the second direction, there are no touch patterns disposed between the optical sensors and at least one of the neighboring first sub-pixel units and second sub-pixel units in the first direction, and there are no touch patterns disposed between the optical sensors and at least one of the neighboring third sub-pixel units in the second direction. In the present application, by not disposing the touch patterns between the optical sensors and at least one of the adjacent third sub-pixel units, light reflected from the touch electrodes to the optical sensors when the third sub-pixel units are illuminated is reduced, the interference to the optical sensors caused by the light of the pixel units reflected from the touch electrodes is reduced, and the signal-to-noise ratio of the optical sensors is improved.

In the above embodiments, the description of each embodiment has its own focus, and the parts that are not described in detail in a certain embodiment can be referred to the relevant description of other embodiments.

A display panel and a display device disposed by embodiments of the present application are described in detail above, specific embodiments have been applied herein to illustrate the principles and implementation of the present application, and the above description of the embodiments is only used to help understand the technical solutions and the core ideas of the present application; a person of ordinary skill in the art should understand that it is still feasible to make modifications to the technical solutions documented in the foregoing embodiments, or make equivalent replacements of some of the technical features therein; and such modifications or replacements do not take the essence of the corresponding technical solutions out of the scope of the technical solutions of the various embodiments of the present application.

What is claimed is:
1. A display panel comprising:
   a substrate;
   a driving circuit layer disposed on a side of the substrate, in which the driving circuit layer comprises a plurality of driving circuits and optical sensors disposed between the driving circuits;

a light-emitting layer disposed on a side of the driving circuit layer away from the substrate, in which the light-emitting layer comprises a plurality of pixel units disposed in an array, and the pixel units are electrically connected to corresponding drive circuits; and a touch control layer disposed on a side of the light-emitting layer away from the substrate, in which the touch control layer comprises a plurality of touch electrodes comprising touch patterns disposed between the pixel units;

wherein the plurality of the pixel units comprise a plurality of first sub-pixel units, a plurality of second sub-pixel units, and a plurality of third sub-pixel units; the plurality of the first sub-pixel units and the plurality of the second sub-pixel units are alternately arranged in a first direction to form a plurality of first pixel rows, the plurality of the first sub-pixel units and the plurality of the second sub-pixel units are all alternately arranged in a second direction to form a plurality of first pixel columns, the plurality of the third sub-pixel units are arranged in the first direction to form a plurality of second pixel rows, and the plurality of the third sub-pixel units are arranged in the second direction to form a plurality of second pixel columns; the first direction is intersected by the second direction;

the optical sensors are disposed in the first direction between adjacent first sub-pixel units and second sub-pixel units, and the optical sensors are disposed in the second direction between adjacent third sub-pixel units;

the touch patterns are not disposed between the optical sensors and at least one of adjacent first sub-pixel units and second sub-pixel units in the first direction; and the touch patterns are not disposed between the optical sensors and at least one of adjacent third sub-pixel units in the second direction.

2. The display panel of claim 1, wherein in a touch electrode, the touch patterns are not disposed between the optical sensors and the third sub-pixel units adjacent to their first side in a second pixel column; and the touch patterns are also not disposed between the optical sensors and the third sub-pixel units adjacent to their first side in an adjacent second pixel column.

3. The display panel of claim 1, wherein in a touch electrode, the touch patterns are not disposed between the optical sensors and the third sub-pixel units adjacent to their first side in a second pixel column; the touch patterns are not disposed between the optical sensors and the third sub-pixel units adjacent to their second side in an adjacent second pixel column; and the first side is opposite to the second side.

4. The display panel of claim 1, wherein an area of the first sub-pixel units is greater than an area of the second sub-pixel units,
in the first pixel rows, the touch patterns are not disposed between the optical sensors and the first sub-pixel units adjacent to them, and the touch patterns are disposed between the optical sensors and the second sub-pixel units adjacent to them.

5. The display panel of claim 1, wherein an area of the first sub-pixel units is greater than an area of the second sub-pixel units,
in the first pixel rows, the touch patterns are not disposed between the optical sensors and the second sub-pixel units adjacent to them, and the touch patterns are disposed between the optical sensors and the first sub-pixel units adjacent to them.

6. The display panel of claim 1, wherein an area of the first sub-pixel units is greater than an area of the second sub-pixel units,
in a first pixel column, the touch patterns are not disposed between the optical sensors and the first sub-pixel units adjacent to them, and the touch patterns are not disposed between the optical sensors and the second sub-pixel units adjacent to them; in an adjacent second pixel column, the touch patterns are disposed between the optical sensors and the first sub-pixel units adjacent to them, and the touch patterns are disposed between the optical sensors and the second sub-pixel units adjacent to them.

7. The display panel of claim 1, wherein the touch patterns are disposed between the first sub-pixel units and the second sub-pixel units in a first pixel column.

8. The display panel of claim 1, wherein the touch patterns comprise first line segments disposed around the third sub-pixel units and second line segments connected to the first line segments, two ends of at least one of the first line segments around the third sub-pixel units are disconnected and form an opening in a region between the third sub-pixel units and the optical sensors.

9. The display panel of claim 8, wherein a first end of a first line segment is connected to an end of a second line segment, and a second end of the first line segment is connected to an end of another second line segment.

10. The display panel of claim 8, wherein a first end of a first line segment is connected to an end of a second line segment, and an end of another second line segment is connected to a first point on the first line segment, a width from the first point on the first line segment to the second end of the first line segment is greater than 0.

11. The display panel of claim 8, wherein a second line segment is connected to a second point of a first line segment, and another second line segment is connected to a third point on the first line segment, a portion between the second point on the first line segment and any one end of the first line segment has a width greater than 0, and a portion between the third point on the first line segment and any one end of the first line segment has a width greater than 0.

12. The display panel of claim 1, wherein a color of a light emitted by the first sub-pixel units is blue, a color of a light emitted by the second sub-pixel units is red, and a color of a light emitted by the third sub-pixel units is green.

13. The display panel of claim 1, wherein a positive projection area of the first sub-pixel units is larger than a positive projection area of the second sub-pixel units, and a positive projection area of the second sub-pixel units is larger than a positive projection area of the third sub-pixel units.

14. A display device comprising a display panel, the display panel comprises:
a substrate;
a driving circuit layer disposed on a side of the substrate, in which the driving circuit layer comprises a plurality of driving circuits and optical sensors disposed between the driving circuits;
a light-emitting layer disposed on a side of the driving circuit layer away from the substrate, in which the light-emitting layer comprises a plurality of pixel units disposed in an array, and the pixel units are electrically connected to corresponding drive circuits; and
a touch control layer disposed on a side of the light-emitting layer away from the substrate, in which the touch control layer comprises a plurality of touch electrodes comprising touch patterns disposed between the pixel units;

wherein the plurality of the pixel units comprise a plurality of first sub-pixel units, a plurality of second sub-pixel units, and a plurality of third sub-pixel units; the plurality of the first sub-pixel units and the plurality of the second sub-pixel units are alternately arranged in a first direction to form a plurality of first pixel rows, the plurality of the first sub-pixel units and the plurality of the second sub-pixel units are all alternately arranged in a second direction to form a plurality of first pixel columns, the plurality of the third sub-pixel units are arranged in the first direction to form a plurality of second pixel rows, and the plurality of the third sub-pixel units are arranged in the second direction to form a plurality of second pixel columns; the first direction is intersected by the second direction;

the optical sensors are disposed in the first direction between adjacent first sub-pixel units and second sub-pixel units, and the optical sensors are disposed in the second direction between adjacent third sub-pixel units;

the touch patterns are not disposed between the optical sensors and at least one of adjacent first sub-pixel units and second sub-pixel units in the first direction; and the touch patterns are not disposed between the optical sensors and at least one of adjacent third sub-pixel units in the second direction.

15. The display device of claim 14, wherein in a touch electrode, the touch patterns are not disposed between the optical sensors and the third sub-pixel units adjacent to their first side in a second pixel column; and the touch patterns are also not disposed between the optical sensors and the third sub-pixel units adjacent to their first side in an adjacent second pixel column.

16. The display device of claim 14, wherein in a touch electrode, the touch patterns are not disposed between the optical sensors and the third sub-pixel units adjacent to their first side in a second pixel column; the touch patterns are not disposed between the optical sensors and the third sub-pixel units adjacent to their second side in an adjacent second pixel column; and the first side is opposite to the second side.

17. The display device of claim 14, wherein an area of the first sub-pixel units is greater than an area of the second sub-pixel units,
   in the first pixel rows, the touch patterns are not disposed between the optical sensors and the first sub-pixel units adjacent to them, and the touch patterns are disposed between the optical sensors and the second sub-pixel units adjacent to them.

18. The display device of claim 14, wherein an area of the first sub-pixel units is greater than an area of the second sub-pixel units,
   in the first pixel rows, the touch patterns are not disposed between the optical sensors and the second sub-pixel units adjacent to them, and the touch patterns are disposed between the optical sensors and the first sub-pixel units adjacent to them.

19. The display device of claim 14, wherein an area of the first sub-pixel units is greater than an area of the second sub-pixel units,
   in a first pixel column, the touch patterns are not disposed between the optical sensors and the first sub-pixel units adjacent to them, and the touch patterns are not disposed between the optical sensors and the second sub-pixel units adjacent to them; in an adjacent first pixel column, the touch patterns are disposed between the optical sensors and the first sub-pixel units adjacent to them, and the touch patterns are disposed between the optical sensors and the second sub-pixel units adjacent to them.

20. The display device of claim 14, wherein the touch patterns are disposed between the first sub-pixel units and the second sub-pixel units in a first pixel column.

* * * * *